(12) United States Patent
Luo

(10) Patent No.: US 7,519,567 B2
(45) Date of Patent: Apr. 14, 2009

(54) ENHANCED CLASSIFICATION OF MARGINAL INSTANCES

(75) Inventor: Huitao Luo, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 13 days.

(21) Appl. No.: 11/262,653

(22) Filed: Oct. 31, 2005

(65) Prior Publication Data

US 2007/0112709 A1 May 17, 2007

(51) Int. Cl.
*G06N 5/00* (2006.01)
(52) U.S. Cl. ...................................................... 706/45
(58) Field of Classification Search .................. 706/45; 342/64; 379/386; 382/260
See application file for complete search history.

(56) References Cited

U.S. PATENT DOCUMENTS

| | | | | |
|---|---|---|---|---|
| 5,341,142 | A | * | 8/1994 | Reis et al. ...................... 342/64 |
| 5,353,346 | A | * | 10/1994 | Cox et al. ..................... 379/386 |
| 5,751,862 | A | * | 5/1998 | Williams et al. ............. 382/260 |
| 6,026,189 | A | * | 2/2000 | Greenspan .................. 382/226 |
| 6,205,247 | B1 | | 3/2001 | Breuer et al. |
| 6,546,379 | B1 | | 4/2003 | Hong et al. |
| 6,823,323 | B2 | | 11/2004 | Forman |
| 2002/0102024 | A1 | | 8/2002 | Jones et al. |
| 2004/0013304 | A1 | | 1/2004 | Viola et al. |

OTHER PUBLICATIONS

Jie Sun et al., "Automatic cascade training with perturbation bias," CVPR (2) pp. 276-283 (Jun. 27-Jul. 2, 2004).
Freund et al., "A short introduction to boosting," J. of Jap. Soc. for Artificial Intelligence, vol. 14(5), pp. 771-780 (1999).
Viola et al., "Robust real-time object detection," Cambridge Research Library Technical Report Series, CRL 2001/01 (Feb. 2001).
Viola et al., "Rapid object detection using a boosted cascade of simple features," Proc. Intl. Conf. on Computer Vision &Pattern Recognition (CVPR), 1, pp. 511-518 (2001).

* cited by examiner

*Primary Examiner*—Wilbert L Starks, Jr.

(57) ABSTRACT

Methods, systems, and machine readable media storing machine-readable instructions for enhanced classification of marginal instances are described. In one aspect, a classification system includes a cascade of forward classification stages and a marginal instance classifier. Each of the forward classification stages is configured to classify an instance into one of a rejected class, an unconditionally accepted class, and a conditionally accepted class. The cascade is configured to reject each instance classified into the rejected class by at least one of the forward classification stages, accept each instance classified into the unconditionally accepted class by all of the forward classification stages, and conditionally accept each instance classified into the conditionally accepted class by at least one of the forward classification stages. The marginal instance classifier is configured to classify each instance conditionally accepted by the cascade into one of a rejected class and an accepted class.

26 Claims, 4 Drawing Sheets

ENHANCED CLASSIFICATION OF MARGINAL INSTANCES

BACKGROUND

Classifiers are used in many application environments, including machine learning, pattern recognition, and data mining. In general, a classifier provides a function that maps (or classifies) an instance into one of multiple predefined potential classes. A classifier typically predicts one attribute of a set of instances given one or more attributes (or features). The attribute being predicted typically is called the label, and the attributes used for prediction typically are called descriptive attributes. A classifier typically is constructed by an inducer, which is a method that builds the classifier from a training set of sample data. The training set consists of samples containing attributes, one of which is the class label. After a classifier has been built, its structure may be used to classify unlabeled instances as belonging to one or more of the potential classes.

Many different classifiers have been proposed. In application environments in which the amount of negative data is much greater than the amount of positive data, it has been discovered that it is computationally more efficient to decompose a complex single-stage classifier into a cascade of relatively simple classification stages. Such a cascaded classifier typically is designed so that the initial classification stages efficiently reject negative instances, and the final classification stages in the cascade only process the positive instances and the negative instances that are hard to distinguish from positive instances. In cases where the number of negative instances far outnumbers the number of positive instances, such a cascaded classifier is much more efficient than classifiers that process each instance in a single stage.

In a typical cascaded classifier design, each classification stage has a respective classification boundary that is controlled by a respective threshold. The overall classification boundary of the classifier is changed whenever one or more of the thresholds for the individual classification stages are changed. In a different cascaded classifier approach, each classification stage has two classification boundaries that are respectively controlled by an acceptance threshold and a rejection threshold. In one implementation, this approach is used to detect an object, such as a face in an image. Features in each image patch are evaluated through successive stages of the classifier to determine a cumulative score. At each stage, the image is rejected when the cumulative score is less than the rejection threshold and accepted when the cumulative score is greater than the acceptance threshold. The evaluating is repeated while the cumulative score is within a range of the acceptance threshold and the rejection threshold. In this approach, an image patch may be accepted at each of the classification stages. As a result, image patches may be accepted erroneously at unacceptably high rates unless the acceptance threshold is high, in which case a large number of classification stages would be needed to evaluate the image patches between the acceptance and rejection thresholds.

What is need is a classification approach in which marginal instances near the acceptance and rejection threshold boundaries are classified robustly and accurately without unduly increasing the number of the classification stages.

SUMMARY

In one aspect, the invention features a classification system that includes a cascade of forward classification stages and a marginal instance classifier. Each of the forward classification stages is configured to classify an instance into one of a rejected class, an unconditionally accepted class, and a conditionally accepted class. The cascade is configured to reject each instance that is classified into the rejected class by at least one of the forward classification stages, accept each instance that is classified into the unconditionally accepted class by all of the forward classification stages, and conditionally accept each instance that is classified into the conditionally accepted class by at least one of the forward classification stages. The marginal instance classifier is configured to classify each instance conditionally accepted by the cascade into one of a rejected class and an accepted class.

In another aspect, the invention features a classification method in accordance with which instances are classified in a series of successive forward classification stages. At each forward classification stage an instance is classified into one of a rejected class, an unconditionally accepted class, and a conditionally accepted class. Each instance that is classified into the rejected class in at least one of the forward classification stages is rejected. Each instance that is classified into the unconditionally accepted class in all of the forward classification stages is accepted. Each instance that is classified into the conditionally accepted class in at least one of the forward classification stages is conditionally accepted. Each of the conditionally accepted instances is classified into one of a rejected class and an accepted class.

The invention also features a machine-readable medium storing machine-readable instructions for causing a machine to perform operations implementing the above-described classification method.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail below enable the classification performance of a classification system to be improved by explicitly identifying marginal instances, which may be more difficult to classify, and separately classifying the identified marginal instances. Since the marginal instances typically represent only a small fraction of all of the accepted instances, these embodiments improve the accuracy with which instances may be classified without requiring significant amounts of additional processing resources. In addition, these embodiments increase the flexibility with which the classification boundaries of a classification system may be tailored.

II. Architectural Overview

Figure 1:
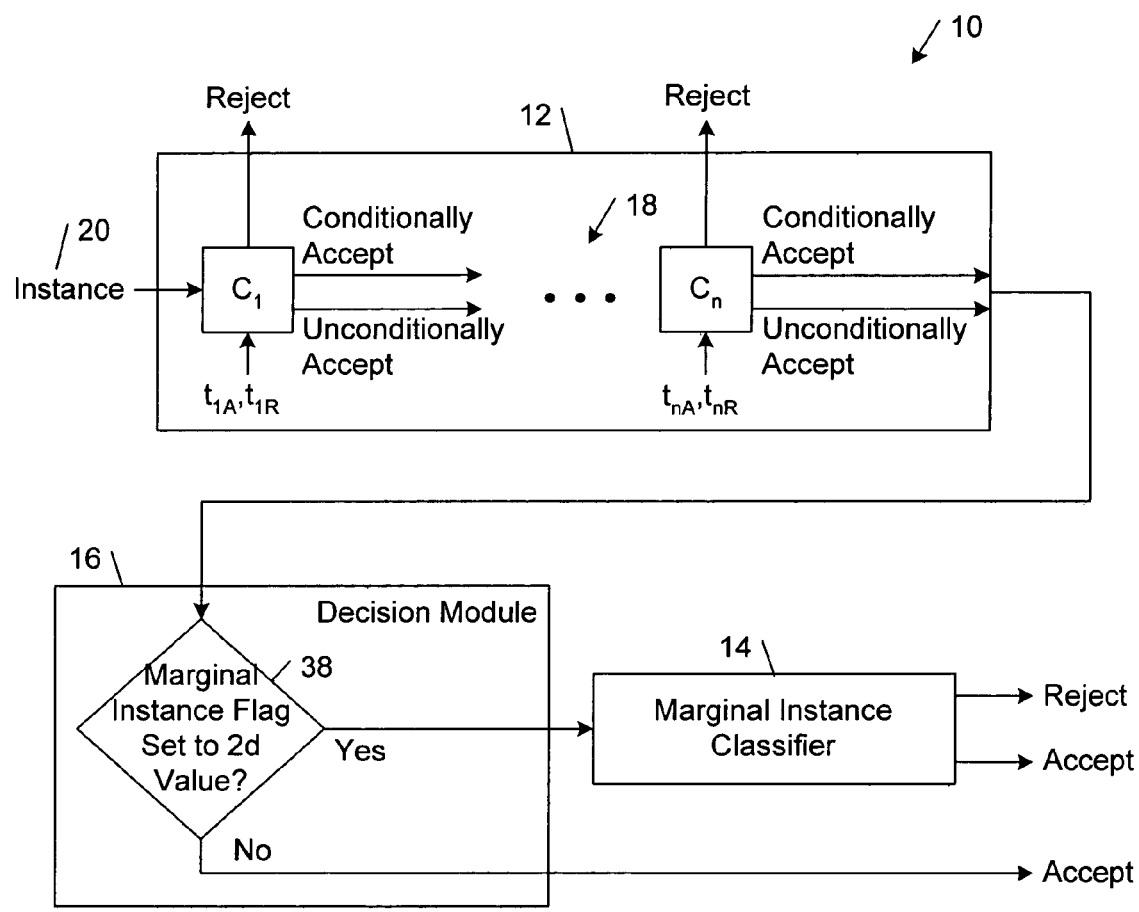
FIG. 1 is a block diagram of an embodiment of a classification system that includes a cascaded classifier, a decision module, and a marginal instance classifier.

FIG. 1 shows an embodiment of a classification system 10 that includes a cascaded classifier 12, a marginal instance classifier 14, and a decision module 16. In general, the classifiers 12, 14 and the decision module 16 are not limited to any particular hardware or software configuration, but rather they may be implemented in any computing or processing environment, including in digital electronic circuitry or in computer hardware, firmware, device driver, or software. For example, in some implementations, these modules may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants).

In some implementations, computer process instructions for implementing the classifiers 12, 14, the decision module 16, and the data generated by these components are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable hard disks, magneto-optical disks, and CD-ROM.

The cascaded classifier 12 has n forward classification stages 18 ($C_1$, $C_2$, ..., $C_n$), where n has an integer value greater than 1. Each forward classification stage $C_i$ has two respective classification boundaries that are controlled by respective acceptance and rejection thresholds $t_{iA}$, $t_{iR}$, where $i=1, ..., n$. In the illustrated embodiment, each of the forward classification stages 18 ($C_1$, $C_2$, ..., $C_n$) performs a three-state discrimination function that classifies an instance 20 into one of three classes (rejected, unconditionally accepted, and conditionally accepted) based on a likelihood score (or discrimination measure) that is computed from one or more attributes of the instance 20. The value of the computed likelihood score relative to the corresponding thresholds determines the class into which the instance 20 will be classified by each classification stage 18. For example, in some implementations, if the likelihood score that is computed for the instance 20 is above the acceptance threshold $t_{iA}$ for a classification stage $C_i$, the instance 20 is classified into the unconditionally accepted class; if the computed likelihood score is below the rejection threshold $t_{iR}$, the instance 20 is classified into the rejected class and classification of the given instance terminates; and if the computed likelihood score is between the acceptance and rejection thresholds $t_{iA}$, $t_{iR}$, the instance 20 is classified into the conditionally accepted class.

Figure 2:
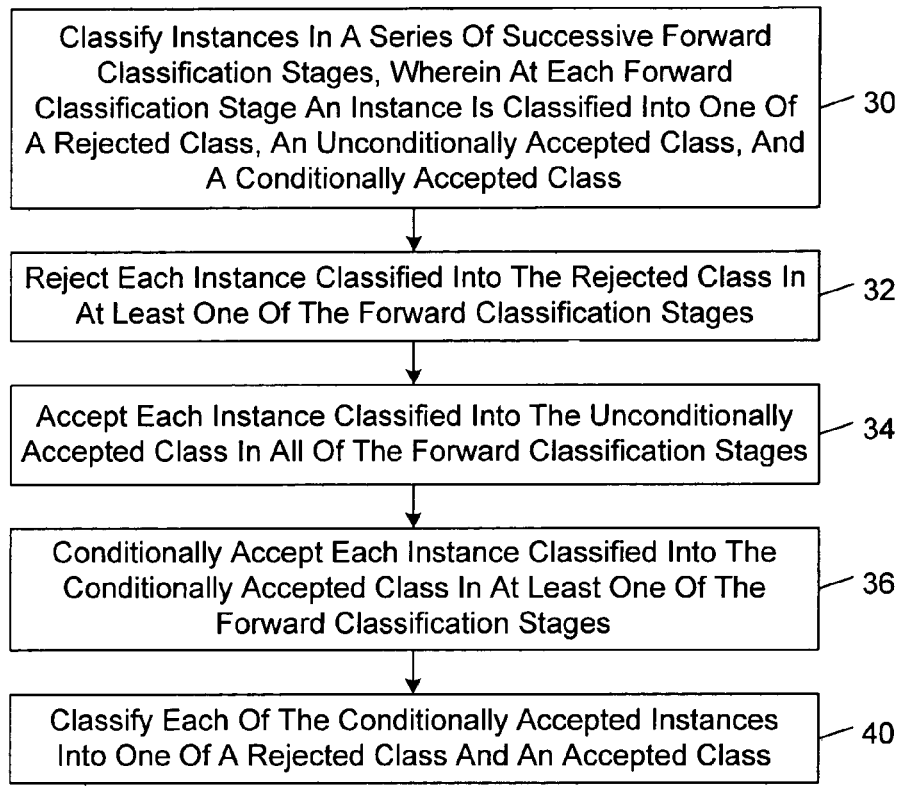
FIG. 2 is a flow diagram of an embodiment of a classification method.

FIG. 2 shows an embodiment of a method by which the classification system 10 classifies instances 20.

In accordance with this method, the cascaded classifier 12 classifies each instance 20 through the series of successive forward classification stages 18. At each forward classification stage 18, an instance 20 is classified into one of a rejected class, an unconditionally accepted class, and a conditionally accepted class (block 30). The cascaded classifier 12 rejects each instance 20 that is classified into the rejected class in at least one of the forward classification stages 18 (block 32), terminating classification of the given instance. The cascaded classifier 12 accepts each instance 20 that is classified into the unconditionally accepted class in all of the forward classification stages 18 (block 34). In other words, each instance is classified successively by the forward classification stages 18 so long as the instance is classified into one of (i) the unconditionally accepted class and (ii) the conditionally accepted class by each of the preceding forward classification stages 18. The cascaded classifier 12 conditionally accepts each instance 20 that is classified into the conditionally accepted class in at least one of the forward classification stages 18 (block 36).

In the illustrated embodiment, a global marginal instance flag is used to label marginal instances (i.e., instances that are conditionally accepted by at least one of the forward classification stages 18). For each instance 20, the global marginal instance flag initially is set equal to a first value (e.g., zero). The cascaded classifier 12 sets the global marginal instance flag equal to a second value (e.g., one), if the instance 20 is classified into the conditionally accepted class by at least one of the forward classification stages 18 (i.e., the instance is a "marginal instance").

In the embodiment shown in FIG. 1, the decision module 16 receives the instances that have passed through the cascaded classifier 12 without being rejected by any of the forward classification stages 18. In block 38 (FIG. 1), the decision module 16 determines whether the global marginal instance flag was set to the second value by the cascaded classifier 12 for a current one of the unrejected instances. If the global marginal instance flag was not set to the second value (block 38; FIG. 1), the decision module 16 accepts the instance. In this case, the instance was unconditionally accepted by all of the forward classification stages 18 of the cascaded classifier 12. If the global instance flag was set to the second value (block 38; FIG. 1), the decision module 16 passes to the marginal instance classifier 14 the likelihood scores that were generated by the forward classification stages 18 of the cascaded classifier 12 for the current one of the unrejected instances. In this case, the current instance is a marginal instance that was conditionally accepted by at least one of the forward classification stages 18 of the cascaded classifier 12.

The marginal instance classifier 14 classifies each of the marginal instances into one of a rejected class and an accepted class (block 40; FIG. 2). In the illustrated embodiment, the marginal instance classifier 14 is a classifier that accepts or rejects the current marginal instance based on the likelihood scores that were generated by the forward classification stages 18 of the cascaded classifier 12 for the current marginal instance.

III. Designing the Cascaded Classifier and the Marginal Instance Classifier

A. Cascaded Classifier Design

In general, the classification system 10 may be designed to classify data instances that are relevant to any type of application environment, including machine learning, pattern recognition, and data mining.

Figure 3:
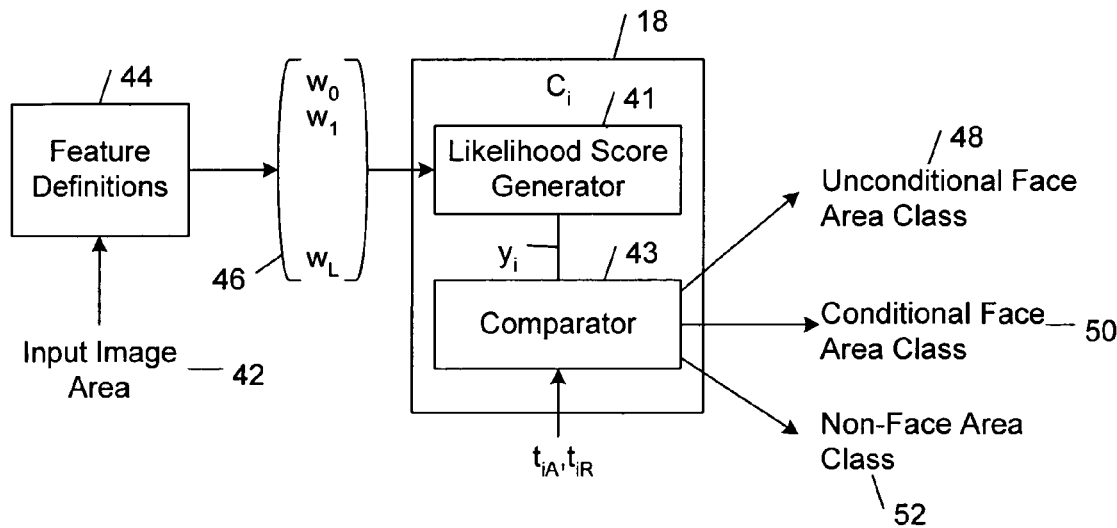
FIG. 3 shows diagrammatic view of an embodiment of a single classification stage in an implementation of the cascaded classifier that is shown in FIG. 1.

FIG. 3 shows an exemplary embodiment of a single classification stage 18 in an implementation of the cascaded classifier 12 that is designed to detect in an input image candidate areas that are likely to contain faces. In this embodiment, the classification stage 18 includes a likelihood score generator 41 and a comparator 43.

In operation, the data corresponding to an area 42 of an input image is projected into a feature space in accordance with a set of feature definitions 44. Input image area 42 includes any information relating to an area of an input image, including color values of input image pixels and other information derived from the input image needed to compute feature weights. Each feature 44 is defined by a rule that describes how to compute or measure a respective weight ($w_0, w_1, \ldots, w_L$) for a candidate face area that corresponds to the contribution of the feature to the representation of the candidate face area in the feature space spanned by the set of features 44. The set of weights ($w_0, w_1, \ldots, w_L$) that is computed for a candidate face area constitutes a feature vector 46. The feature vector 46 is input into the likelihood score generator 41 of the classification stage 18.

The likelihood score generator 41 generates a likelihood score $y_i$ based on the discrimination function defined in equation (1) below. The comparator 43 compares the likelihood score $y_i$ with the acceptance and rejection thresholds $t_{iA}$ and $t_{iR}$. Based on the results of the comparison, the comparator 43 classifies the corresponding candidate face area into one of: an unconditional face area class 48; a conditional face area class 50; and a non-face class 52. The instances that are in the unconditional face area class 48 and the conditional face area class 50 are passed to the next successive classification stage $C_{i+1}$, which implements a different discrimination function $D_{i+1}(x)$.

In some implementations, likelihood score generator 41 of each classification stage 18 ($C_i$) computes a likelihood score $y_i$ based on a discrimination function $D_i(x)$ that is defined in equation (1):

$$y_i = D_i(x) = \sum_{l=1}^{L} g_{il} h_{il}(x) \quad (1)$$

where $x=(w_0, w_1, \ldots, w_L)$ (i.e., x is the feature vector 46 corresponding to the input image area 42), and $g_{il}$ are weights that the likelihood score generator 41 applies to the corresponding threshold function $h_{il}(x)$, which is defined by equation (2):

$$h_{il}(x) = \begin{cases} 1, & \text{if } p_l w_l > p_l t_{il} \\ 0, & \text{otherwise} \end{cases} \quad (2)$$

The variable $p_l$ has a polarity value of +1 or −1, $t_{il}$ is the threshold for feature l that is used in classification stage $C_i$.

The classification stage 18 ($C_i$) classifies an instance 20 based on the likelihood score $y_i$ that is computed for the classification stage $C_i$ using equation (1) and the acceptance and rejection thresholds $t_{iA}$, $t_{iR}$, as follows:

$y_i < t_{iR}$, classify the current instance into the rejected class $y_i > t_{iA}$, classify the current instance into the unconditionally accepted class $t_{iR} \leq y_i \leq t_{iA}$, classify the current instance into the conditionally accepted class Referring to FIGS. 4A and 4B, in some embodiments, the cascaded classifier 12 is designed in three steps based on a cascade 100 of two-state classification stages 102, as follows.

Figure 4A:
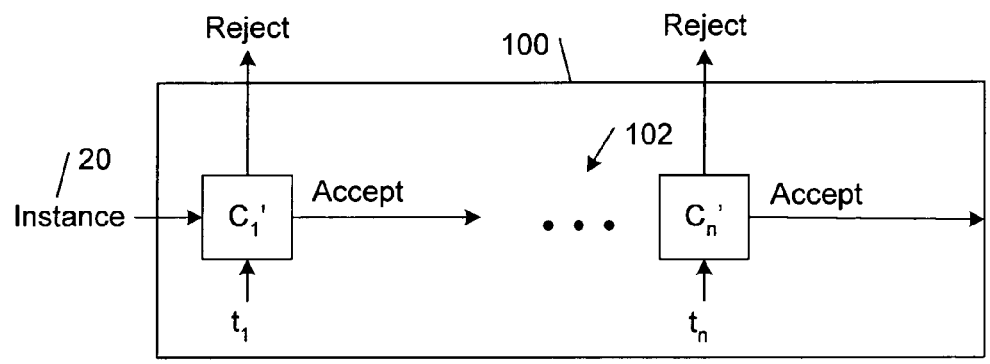
FIG. 4A is a block diagram of an embodiment of a cascade of two-state classification stages that is used to build an implementation of the cascaded classifier shown in FIG. 1.
Figure 4B:
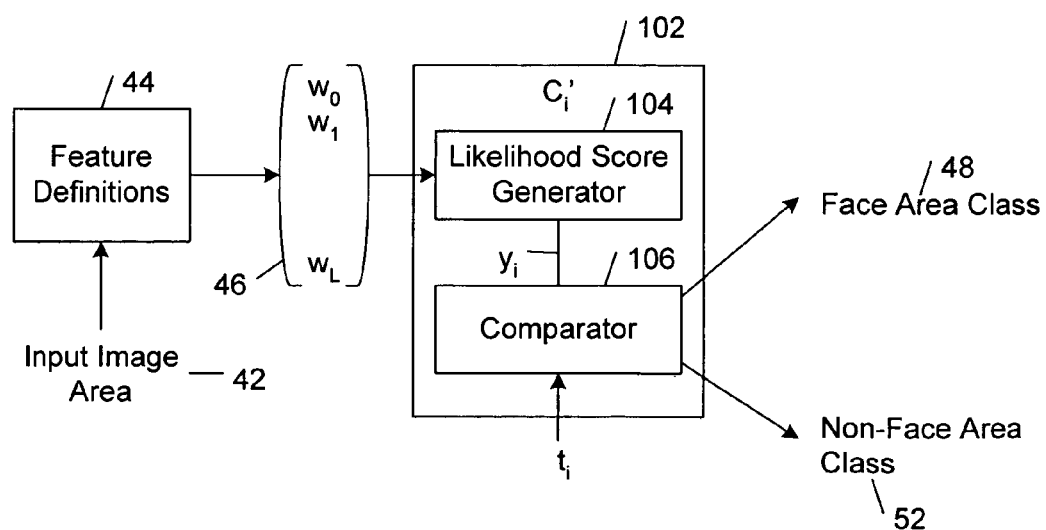
FIG. 4B shows diagrammatic view of an embodiment of a single classification stage of the cascaded classifier that is shown in FIG. 4A.

In the first step, the cascade 100 of two-state classification stages 102 is built as shown in FIG. 4A. FIG. 4B shows the architecture of each of the classification stages 102. Each two-state classification stage 102 includes a likelihood score generator 104 and a comparator 106. The likelihood score generator 104 is configured to generate likelihood scores $y_i$ in the same way as the likelihood score generator 41, which is described above. At each classification stage 102 ($C_i'$), the comparator 106 compares the likelihood scores $y_i$ with only one threshold $t_i$ and classifies each instance 20 into one of a rejected class (e.g., the non-face area class 52) or an accepted class (e.g., the face area class 48) based on the results of the comparison. Thus, each classification stage 102 has a respective classification boundary that is controlled by a respective threshold $t_i$, and the overall classification boundary of the cascaded classifier 100 is changed whenever one or more of the thresholds for the individual classification stages 102 are changed.

In the second step, the thresholds $t_i$ are determined for the two-state classification stages 102 ($C_i'$) based on desired performance goals, such as a desired minimum detection rate or a desired maximum false alarm rate. Any one of a wide variety of different methods may be used. In one exemplary approach, the classification stages initially are trained using a technique referred to as the AdaBoost inducing method, which provides an initial set of default threshold values for the classification stages. Each classification stage then is optimized individually by adjusting the default threshold value that is assigned to the classification stage in a way that minimizes the incidence of false negatives (i.e., incorrect rejections of positive instances).

In the third step, an optimization process is applied to optimize the performance of the cascaded classifier 100 based on the thresholds $t_i$ that were determined for the classification stages 102 in the second step. In this optimization process, the acceptance and rejection thresholds for each classification stage 18 of the cascaded classifier 12 are identified by determining a receiver operating characteristic curve (ROC) for the cascaded classifier 100 and selecting points on the ROC curve corresponding to the acceptance and rejection thresholds.

In the following description, each set k of values for the thresholds ($t_{1k}, t_{2k}, \ldots, t_{nk}$) for the classification stages $C_i'$ defines a respective threshold vector $T_k=(t_{1k}, t_{2k}, \ldots, t_{nk})$ that corresponds to a respective operating point of the cascaded classifier 100 and, consequently, determines the discrimination performance of the cascaded classifier 100.

The discrimination performance of the cascaded classifier 100 may be represented by a receiver operating characteristic (ROC) curve. In some implementations, the ROC curve corresponds to a mapping of measures of correct detection performance (e.g., correct detection rate or true positive rate) of the classifier to corresponding measures of false positive performance (e.g., false positive rate) of the classifier for different threshold vectors $T_k$. These performance measures, and consequently the sets of acceptance and rejection thresholds, are determined based on pre-labeled training data associated with labels corresponding to the rejected class, the unconditionally accepted class, and the conditionally accepted class. In general, each threshold vector $T_k$ has n threshold variables $t_{ik}$ that correspond to n basis vectors $e_i$ spanning an n-dimensional space $R^n$, where i=1, \ldots, n. The overall performance of the cascaded classifier 100 may be optimized by identifying the threshold vectors $t_i$ that define the operating points of the cascaded classifier 100 that lie on an ROC curve that represents an optimal discrimination performance of the cascaded classifier 100 in terms of a selected set of one or more evaluation criteria.

In the illustrated embodiments, the optimal performance of the cascaded classifier 100 is determined, by determining the highest possible detection rate d for each value of false alarm rate f by varying the threshold vectors $T_k$ in n-dimensional space $R^n$. The false alarm rate, the highest detection rate, and the threshold vector are represented herein by f*, d*, T*, respectively. The parameter triplet (f*,d*,T*) represents an optimal operating point of cascaded classifier 100, and the parameter pair (f*, d*) determines one point on the optimal ROC curve of the cascaded classifier 100. The optimal ROC curve and the corresponding sets of parameter triplets (f*,d*, T*) for the cascaded classifier 100 may be determined in accordance with the method described in U.S. application Ser. No. 10/973,217, filed Oct. 26, 2004, by Huitao Luo, and is entitled, "IMPROVING CLASSIFIER PERFORMANCE," which is incorporated herein by reference.

Figure 5:
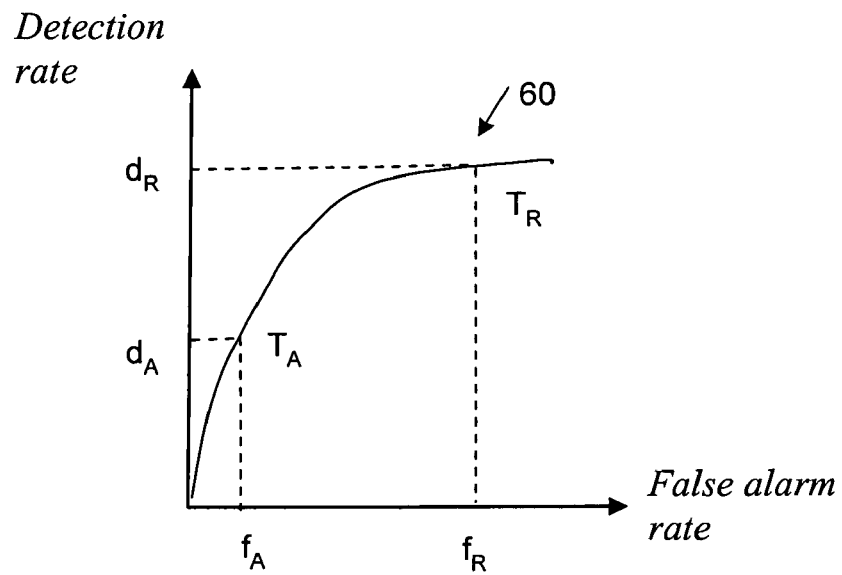
FIG. 5 shows a graph of an exemplary ROC curve for an implementation of the classification system that is shown in FIG. 1.

FIG. 5 shows graph of an exemplary ROC curve 60 for the cascaded classifier 100. In one implementation, the acceptance threshold vector $T_A=(t_{1A}, t_{2A}, \ldots, t_{nA})$ and the rejection threshold vector $T_R=(t_{1R}, t_{2R}, \ldots, t_{nR})$ are selected from the operating points determined by the optimal ROC curve of the cascaded classifier 100. In other words, $T_A$ and $T_R$ represent respective optimal operating points of cascaded classifier 100. If the parameter triplet of these two operating points are denoted by $(f_A, d_A, T_A)$ and $(f_R, d_R, T_R)$, respectively, the acceptance threshold vector $T_A$ is selected so that it corresponds to an operating point with a low false alarm rate $f_A$ (corresponding to the acceptance boundary) and the rejection threshold vector is selected $T_R$ so that it corresponds to an operating point with a high detection rate $d_R$ (corresponding to the rejection boundary). The parameters $f_A$ and $d_R$ also serve as the boundaries on the performance of the overall classification system 10, which is independent of the design of the marginal instance classifier 14. That is, if the overall classification system 10 has a detection rate $d_0$ and a false alarm rate $f_0$, the following constraints are true:

$$d_0 \leq d_R \quad (3)$$

$$f_0 \geq f_A \quad (4)$$

B. Marginal Instance Classifier Design

In some implementations, the marginal instance classifier 14 implements a discrimination function that is defined in equation (5):

$$\sum_{i=1}^{n} r_i s(y_i) > \theta_M \quad (5)$$

where $\theta_M$ is the marginal instance threshold, $y_i$ is the likelihood score computed by the classification stage $C_i$, and $r_i$ are weights that the marginal instance classifier 14 applies to the corresponding threshold function s(i), which is defined in equation (6):

$$s(y_i) = \begin{cases} 1, & \text{if } u_i y_i > u_i v_i \\ 0, & \text{otherwise} \end{cases} \quad (6)$$

The variable $u_i$ has a polarity value of +1 or −1 and $v_i$ is the threshold associated with the likelihood score $y_i$. If the summation in equation (5) is greater than the marginal instance threshold $\theta_M$, the current marginal instance is accepted; otherwise, the current marginal instance is rejected.

Figure 6:
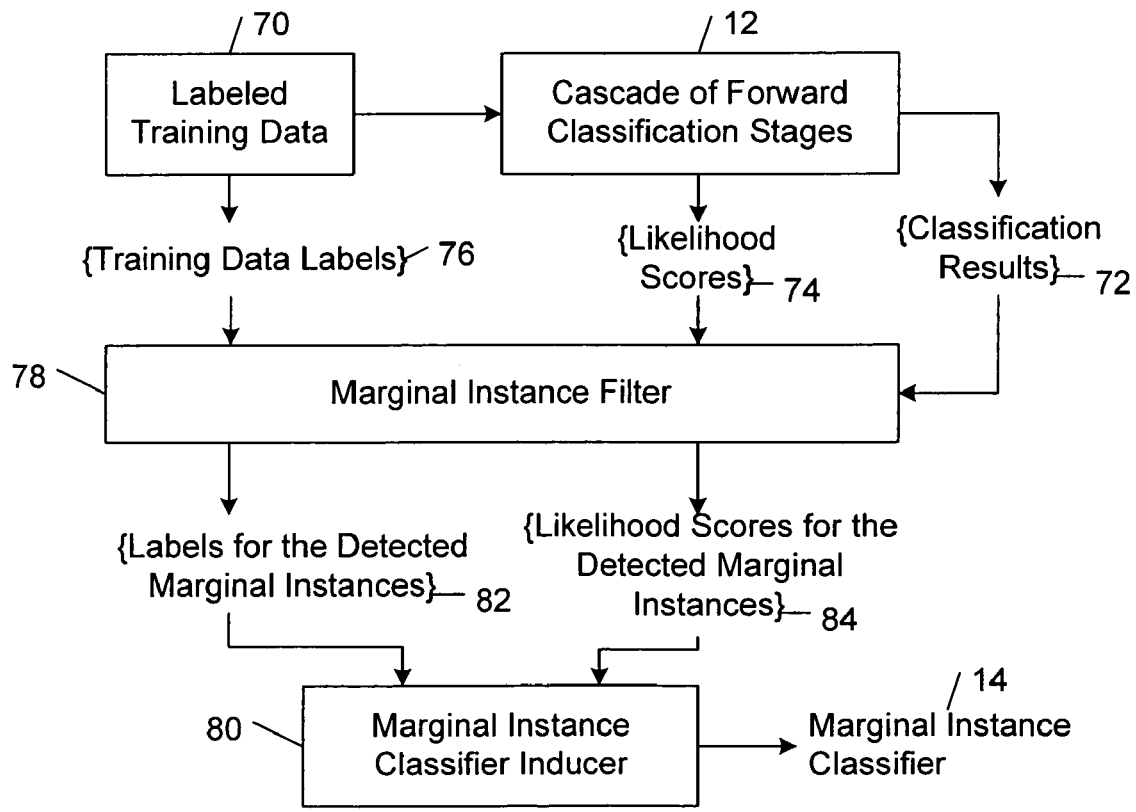
FIG. 6 is a block diagram of an embodiment of a system for training an implementation of the marginal instance classifier that is shown in FIG. 1.

FIG. 6 shows a block diagram of an embodiment of a system for training an implementation of the marginal instance classifier 14. In this embodiment, labeled training data 70 is processed by the cascade 12 of forward classification stages 18. The classification results 72, the likelihood scores 74 that are generated by the classification stages 18, and the training data labels 76 are passed to a marginal instance filter 78. The marginal instance filter 78 passes to a marginal instance classifier inducer 80 only a subset 82 of the labels 76 and a subset 84 of the likelihood scores that correspond to the training data 70 that are detected by the cascaded classifier 12 as marginal instances. The marginal instance classifier inducer 80 then may use any one of a wide variety of different classifier training methods to build the marginal instance classifier 14 from the likelihood scores 84 and the training data labels 82. In this process, the marginal instance classifier inducer 80 determines the marginal instance threshold $\theta_M$ based on the likelihood scores 84 that are generated for the conditionally accepted ones of the training data 70. In some implementations, the marginal instance classifier inducer 80 uses a machine learning method, such as AdaBoost, to generate the marginal instance classifier 14.

IV. Conclusion

The embodiments that are described in detail above enable the classification performance of a classification system to be improved by explicitly identifying marginal instances, which may be more difficult to classify, and separately classifying the identified marginal instances. In addition, these embodiments increase the flexibility with which the classification boundaries of a classification system may be tailored.

Other embodiments are within the scope of the claims.

What is claimed is:

1. A data processing system, comprising computing hardware operable to perform operations comprising:

processing input data instances through an ordered cascade of successive forward classification stages each configured to determine a respective likelihood score for each of the input data instances based on one or more attributes of the input data instance and to classify each of the input data instances by one of rejecting the input data instance, unconditionally accepting the input data instance, and conditionally accepting the input data instance based on the respective likelihood score, wherein in the processing the computing hardware causes the cascade to generate for each of the input data instances rejected by at least one of the forward classification stages a respective classification record indicative of classification into a rejected class, generate for each of the input data instances unconditionally accepted by all of the forward classification stages a respective classification record indicative of classification into an accepted class, and conditionally accept each of the input data instances that is conditionally accepted by at least one of the forward classification stages and is unconditionally accepted by all other ones of the forward classification stages; and generating for each of the input data instances conditionally accepted by the cascade a respective classification record indicative of classification into one of the rejected class and the accepted class based on the respective likelihood score determined by each of the forward classification stages for the input data instance.

2. The system of claim 1, wherein each of the forward classification stages is configured to classify the input data instances based on a respective set of first and second thresholds associated with the forward classification stage.

3. The system of claim 2, wherein each of the forward classification stages is configured to classify each of the input data instances based on a comparison of the respective likelihood score with the respective set of first and second thresholds associated with the forward classification stage.

4. The system of claim 3, wherein each of the forward classification stages rejects any of the input data instances with likelihood scores below the corresponding first threshold, unconditionally accepts any of the input data instances with likelihood scores above the corresponding second threshold, and conditionally accepts any of the input data instances with likelihood scores between the corresponding first and second thresholds.

5. The system of claim 3, wherein the sets of first and second thresholds are determined based on training data associated with labels corresponding to the rejected class, an unconditionally accepted class, and a conditionally accepted class.

6. The system of claim 3, wherein the computing hardware is operable to perform operations comprising classifying the conditionally accepted ones of the input data instances based on a marginal instance threshold.

7. The system of claim 1, wherein the classification of any of the input data instances terminates in response to a classification of the input data instance into the rejected class by any of the forward classification stages.

8. The system of claim 1, wherein each of the input data instances is classified by successive ones of the forward classification stages so long as the input data instance remains unrejected by each of the preceding forward classification stages.

9. The system of claim 1, wherein the cascade sets a global marginal instance flag for each of the input data instances that is conditionally accepted by at least one of the forward classification stages and is unconditionally accepted by all other ones of the forward classification stages.

10. The system of claim 1, further comprising at least one machine-readable medium storing the respective classification record generated for each of the input data instances.

11. The system of claim 1, wherein each of the input data instances comprises image data.

12. The system of claim 11, wherein
in the processing, the computing hardware causes each of the forward classification stages to classify each of the input data instances by one of rejecting the input data instance as a face area, unconditionally accepting the input data instance as a face area, and conditionally accepting the input data instance as a face area based on one or more attributes of the input data instance,
in the processing, the computing hardware causes the cascade to generate for each of the input data instances rejected by at least one of the forward classification stages a respective classification record indicative of classification into a non-face area class, and to generate for each of the input data instances unconditionally accepted by all of the forward classification stages a respective classification record indicative of classification into a face area class, and
in the generating, the computing hardware performs operations comprising generating for each of the input data instances conditionally accepted by the cascade a respective classification record indicative of classification into one of the non-face area class and the face area class.

13. The method of claim 1, wherein the computing hardware comprises one or more machine-readable media storing computer process instructions for performing the processing and the generating.

14. A machine-implemented classification method, comprising:
classifying input data instances in a series of successive forward classification stages, wherein each of the forward classification stages determines a respective likelihood score for each of the input data instances based on one or more attributes of the input data instance and classifies each of the input data instances by one of rejecting the input data instance, unconditionally accepting the input data instance, and conditionally accepting the input data instance based on the respective likelihood score;
generating for each of the input data instances rejected in at least one of the forward classification stages a respective classification record indicative of classification into the rejected class;
generating for each of the input data instances unconditionally accepted in all of the forward classification stages a respective classification record indicative of classification into an accepted class;
designating as conditionally accepted each of the input data instances that is conditionally accepted in at least one of the forward classification stages and is unconditionally accepted by all other ones of the forward classification stages; and
producing for each of the input data instances designated as conditionally accepted a respective classification record indicative of classification into one of the rejected class and the accepted class based on the respective likelihood score determined by each of the forward classification stages for the input data instance.

15. The method of claim 14, wherein at each of the forward classification stages an input data instance is classified based on a respective set of first and second thresholds associated with the forward classification stage.

16. The method of claim 15, wherein the classifying comprises at each of the forward classification stages classifying each of the input data instances based on a comparison of the respective likelihood score with the respective set of first and second thresholds associated with the forward classification stage.

17. The method of claim 16, wherein at each of the forward classification stages, input data instances with likelihood scores below the corresponding first threshold are rejected, input data instances with likelihood scores above the corresponding second threshold are unconditionally accepted, and input data instances with likelihood scores between the corresponding first and second thresholds are conditionally accepted.

18. The method of claim 16, further comprising determining the sets of first and second thresholds based on training data associated with labels corresponding to the rejected class, an unconditionally accepted class, and a conditionally accepted class.

19. The method of claim 18, wherein the producing comprises classifying input data instances based on a marginal instance threshold, and further comprising determining the marginal instance threshold based on the likelihood scores determined for ones of the training data conditionally accepted in at least one of the forward classification stages.

20. The method of claim 14, further comprising terminating the classifying of any of the input data instances in response to classification of the input data instance into the rejected class.

21. The method of claim 14, wherein the classifying comprises classifying each of the input data instances through successive ones of the forward classification stages so long as the given input data instance remains unrejected by each of the preceding forward classification stages.

22. The method of claim 14, wherein the designating comprises setting a global marginal instance flag for each of the input data instances that is conditionally accepted by at least one of the forward classification stages and is unconditionally accepted by all other ones of the forward classification stages.

23. The method of claim 14, further comprising storing the respective classification record generated for each of the input data instances in a machine-readable medium.

24. The method of claim 14, wherein each of the input data instances comprises image data.

25. The method of claim 14, wherein each of the classifying, the generating of the respective classification record indicative of classification into the rejected class, the generating of the respective classification record indicative of classification into an accepted class, the designating, and the producing is performed on a physical computing apparatus.

26. A machine-readable medium storing machine-readable instructions for causing a machine to perform operations comprising:

classifying input data instances in a series of successive forward classification stages each configured to determine a respective likelihood score for each of the input data instances based on one or more attributes of the input data instance and to classify each of the input data instances by one of rejecting the input data instance, unconditionally accepting the input data instance, and conditionally accepting the input data instance based, on the respective likelihood score;

assigning to a rejected class each input data instance rejected in at least one of the forward classification stages;

assigning to an accepted class each input data instance unconditionally accepted in all of the forward classification stages;

conditionally accepting each input data instance that is conditionally accepted in at least one of the forward classification stages and is unconditionally accepted by all other ones of the forward classification stages;

assigning each of the conditionally accepted input data instances to either the rejected class or the accepted class based on the respective likelihood score determined by each of the for each input data instance, storing in a machine-readable medium a respective classification record indicative of the one of the rejected class and the accepted class to which the input data instance was assigned based on the respective likelihood score determined by each of the forward classification stages for the input data instance.

* * * * *

UNITED STATES PATENT AND TRADEMARK OFFICE
CERTIFICATE OF CORRECTION

PATENT NO. : 7,519,567 B2  Page 1 of 1
APPLICATION NO. : 11/262653
DATED : April 14, 2009
INVENTOR(S) : Huitao Luo It is certified that error appears in the above-identified patent and that said Letters Patent is hereby corrected as shown below:

In column 12, line 22, in Claim 26, after "each of the" insert -- forward classification stages for the input data instance; and --.

Signed and Sealed this

Twenty-ninth Day of June, 2010

David J. Kappos
*Director of the United States Patent and Trademark Office*